(12) United States Patent
Dudar

(10) Patent No.: US 10,746,135 B2
(45) Date of Patent: Aug. 18, 2020

(54) SYSTEMS AND METHODS FOR REDUCING VEHICLE EMISSIONS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 15/936,012

(22) Filed: Mar. 26, 2018

(65) Prior Publication Data
US 2019/0293031 A1  Sep. 26, 2019

(51) Int. Cl.
*F02M 25/08* (2006.01)
*F02D 41/22* (2006.01)
(Continued)

(52) U.S. Cl.
CPC ....... *F02M 25/0818* (2013.01); *B60K 15/035* (2013.01); *B60W 20/16* (2016.01);
(Continued)

(58) Field of Classification Search
CPC ............ B01D 53/0454; B01D 35/0273; B01D 53/0415; B01D 53/0446; B01D 53/0407; B01D 53/04; F02M 25/0818; F02M 25/0836; F02M 25/089; F02M 35/10222; F02M 25/0854; F02M 37/50; F02M 37/106; F02M 37/008; F02M 225/0809; F02D 41/0037; F02D 41/0007; F02D 41/004; F02D 41/0275; F02D 41/0035; F02D 41/263; F02D 41/0045; F02D 41/0032; F02D 41/22; F02D 41/221; F02D 2250/06; G01M 15/02; G01M 3/34; F02B 37/162; B60K 15/035; B60K 15/03504; B60K 15/03519; B60K 6/48; B60K 15/03; B60K 2015/03243; B60K 2015/03576; B01J 20/28045; B01J 20/28085; B01J 20/28054; B01J 20/20; B01J 20/28011; B01J 20/2803; B01J 20/28042; B01J 20/10; B01J 20/3042; B01J 20/28073; B01J 20/28092;
(Continued)

(56) References Cited

U.S. PATENT DOCUMENTS 9,669,825 B1  6/2017  Dudar
9,708,990 B2  7/2017  Dudar
(Continued)

*Primary Examiner* — Behrang Badii
(74) *Attorney, Agent, or Firm* — Geoffrey Brumbaugh; McCoy Russell LLP

(57) ABSTRACT

Methods and systems are provided for taking mitigating action where a canister purge valve configured to control an amount of fuel vapors inducted into the engine during purging operations of a fuel vapor storage canister, is indicated as being degraded. In one example, a method comprises controlling an amount of pressure directed to a fuel tank and the fuel vapor storage canister via a pump positioned downstream of the fuel tank and canister to actively route fuel vapors to the canister during a refueling event. In this way, fuel vapors may be prevented from being routed to engine intake under conditions of a degraded canister purge valve, which may reduce opportunity for vehicle stall, improve driveability, and which may reduce release of undesired evaporative emissions to atmosphere.

17 Claims, 6 Drawing Sheets

(51) Int. Cl.
*F01N 3/20* (2006.01)
*B60W 20/16* (2016.01)
*B60K 15/035* (2006.01)
B60K 15/03 (2006.01)
B01D 53/04 (2006.01)
B01D 53/047 (2006.01)
F01N 5/04 (2006.01)

(52) U.S. Cl.
CPC ......... *F01N 3/2006* (2013.01); *F02D 41/221* (2013.01); *F02M 25/0836* (2013.01); *B01D 53/047* (2013.01); *B01D 53/0446* (2013.01); *B01D 53/0454* (2013.01); *B60K 2015/03243* (2013.01); *B60K 2015/03576* (2013.01); *F01N 5/04* (2013.01); *F02D 2250/06* (2013.01); *F02M 25/089* (2013.01); *F02M 25/0872* (2013.01)

(58) Field of Classification Search
CPC .... B01J 20/3064; B01J 20/12; B01J 20/3007; B01J 20/3078; F01N 3/0885; F01N 9/00; F01N 3/0842; F01N 3/2033; F01N 3/0871; F01N 3/2006; G06N 20/00; B60W 20/15; B60W 20/16; G01L 19/0038

See application file for complete search history.

(56) References Cited

U.S. PATENT DOCUMENTS

| | | |
|---|---|---|
| 9,850,832 B2 | 12/2017 | Dudar |
| 9,856,830 B2 | 1/2018 | Dudar |
| 2011/0011264 A1* | 1/2011 | Makino ............... F02M 25/0872 96/6 |
| 2016/0290285 A1* | 10/2016 | Dudar ....................... F01N 5/04 |
| 2017/0137022 A1 | 5/2017 | Dudar |
| 2017/0159588 A1* | 6/2017 | Honjo ................ B01D 53/0454 |
| 2017/0217753 A1 | 8/2017 | Dudar |
| 2017/0292476 A1 | 10/2017 | Dudar |
| 2018/0010532 A1 | 1/2018 | Dudar |

* cited by examiner

SYSTEMS AND METHODS FOR REDUCING VEHICLE EMISSIONS

FIELD

The present description relates generally to methods and systems for controlling a vehicle engine to actively route fuel vapors to an emissions control device under conditions that include one or more degraded components or an indication that hydrocarbons are escaping to atmosphere.

BACKGROUND/SUMMARY

Vehicle emission control systems may be configured to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve (CPV) coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, there are circumstances where undesired evaporative emissions (e.g. hydrocarbons, or fuel vapors) may be introduced to atmosphere if mitigating action is not undertaken to prevent such an occurrence. In one example, a CPV, due to frequent use and harsh operating environment, may become degraded. In the case of a degraded CPV, during a refueling event fuel vapors may be introduced to engine intake and then to atmosphere via the degraded CPV (e.g. CPV stuck at least partially open or unable to fully close), rather than being routed to the fuel vapor canister for storage. Furthermore, in such a situation, vehicle stall and/or driveability issues may result post-refueling due to a rich amount of fuel vapors in the intake of the engine, and the first engine crank post-refueling may additionally introduce undesired emissions to atmosphere.

In another example, undesired evaporative emissions may be introduced to atmosphere under situations where vehicle operating conditions and/or environmental conditions result in breakthrough of fuel vapors from a canister. For example, engine run time in hybrid electric vehicles (HEVs) and plug-in hybrid vehicles may be limited, and thus opportunities for purging fuel vapor from the canister may also be limited. If the vehicle is refueled, saturating the canister with fuel vapor, and then parked (or stopped, as in a start/stop event) in a hot, sunny location prior to a purge event, the canister may desorb fuel vapors as it warms up, leading to bleed emissions. In another example, if the canister is at least partially filled with fuel vapor, a refueling event may further load the canister and lead to bleed emissions.

The inventors herein have recognized the above-mentioned issues. The inventors have herein additionally recognized that due to the limited engine run time in hybrid vehicles, in addition to the fact that current and future engines are being designed to reduce intake manifold vacuum as vacuum is a pumping loss, a purge pump positioned between the canister and the CPV is being introduced into such vehicles. Thus, the inventors herein have recognized that the purge pump may be utilized to mitigate release of undesired evaporative emissions and/or driveability issues under conditions of a degraded CPV, or under conditions where bleed through emissions from a canister are indicated to be occurring. Thus, the inventors herein have developed systems and methods to address such issues. In one example, a method comprises controlling an amount of pressure directed to a fuel tank that supplies fuel to an engine of a vehicle, and to a fuel vapor storage canister receiving fuel vapors from the fuel tank, via a pump positioned downstream of the fuel tank and the canister, to actively route fuel vapors to the canister during a refueling event where fuel is added to the fuel tank. In this way, refueling vapors may be prevented from migrating to engine intake under conditions where a CPV is degraded, which may reduce opportunity for vehicle stall and which may improve driveability at the next engine start event, and which may further reduce the release of undesired evaporative emissions to atmosphere.

In one example, the pump may include the engine. In such an example, directing pressure to the fuel tank and to the fuel vapor storage canister via the pump may include rotating the engine unfueled in reverse. In another example, the pump may include a purge pump positioned in a purge line coupling the engine to the canister, and wherein directing pressure to the fuel tank and to the fuel vapor storage canister may include rotating the purge pump in a reverse-mode of operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for preventing or reducing release of undesired evaporative emissions to atmosphere, and for preventing stall/improving drivability at engine start events after a refueling event where a canister purge valve is indicated to be degraded.

Figure 1:
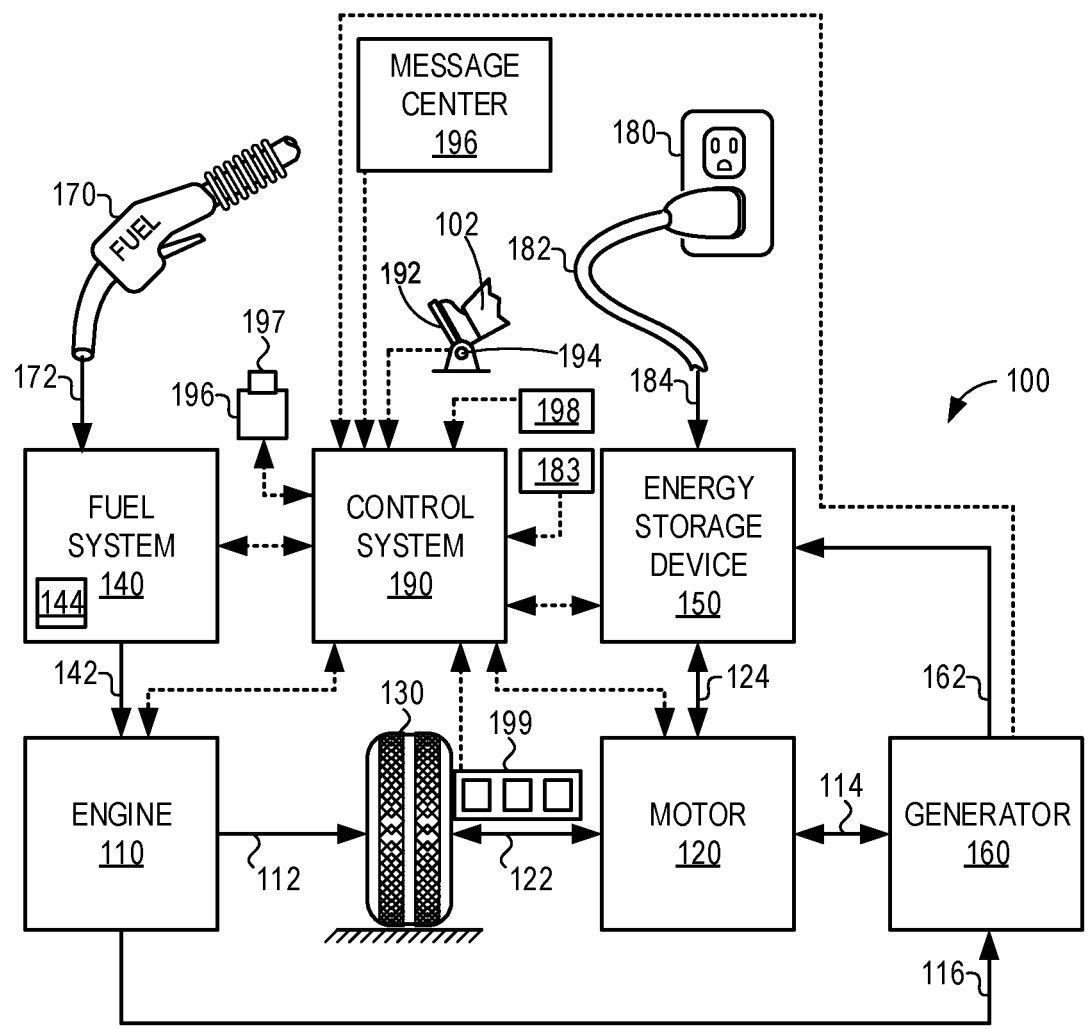
FIG. 1 schematically shows an example vehicle propulsion system.
Figure 2:
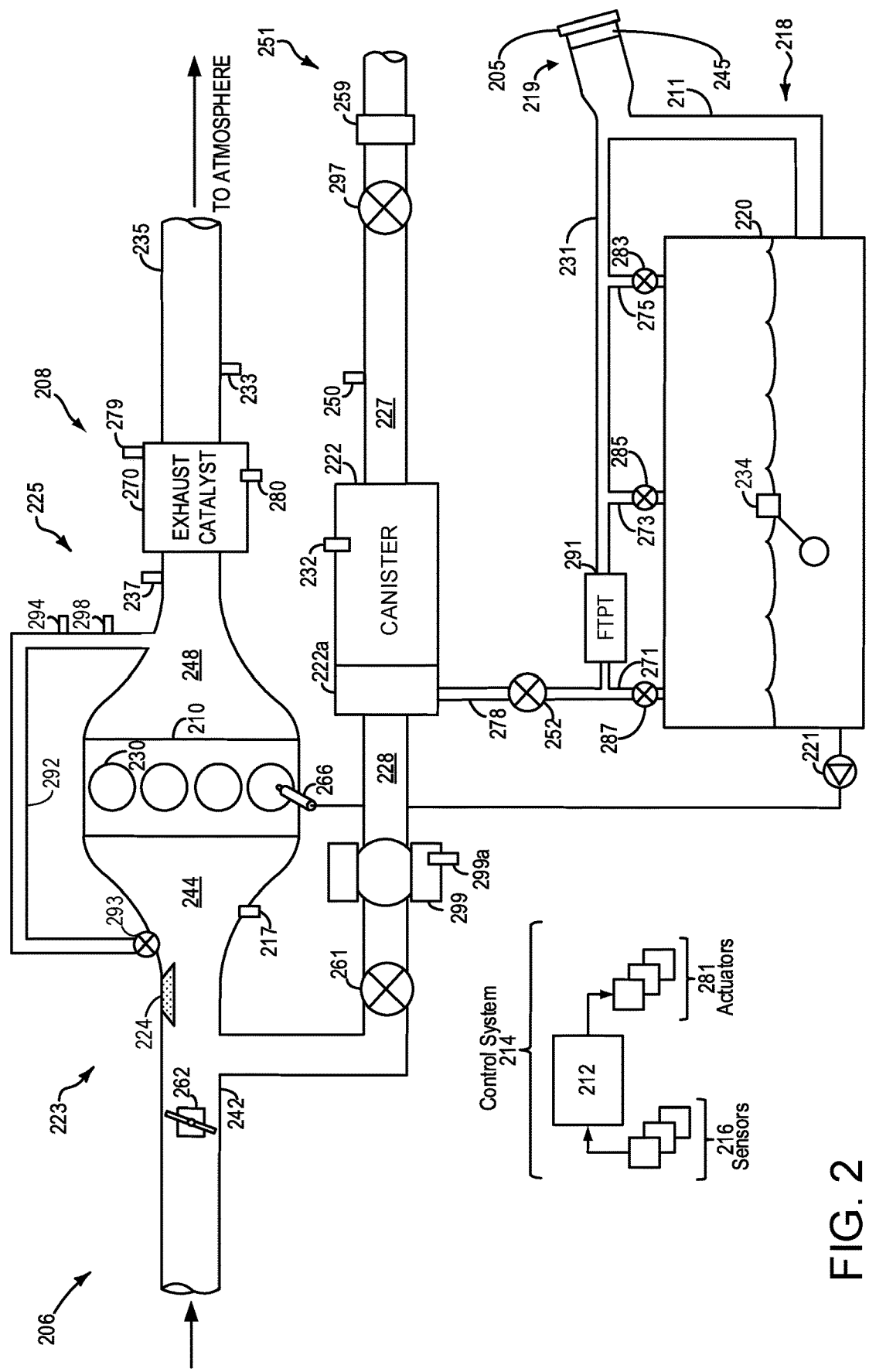
FIG. 2 schematically shows an example vehicle system with a fuel system and an evaporative emissions system.
Figure 3:
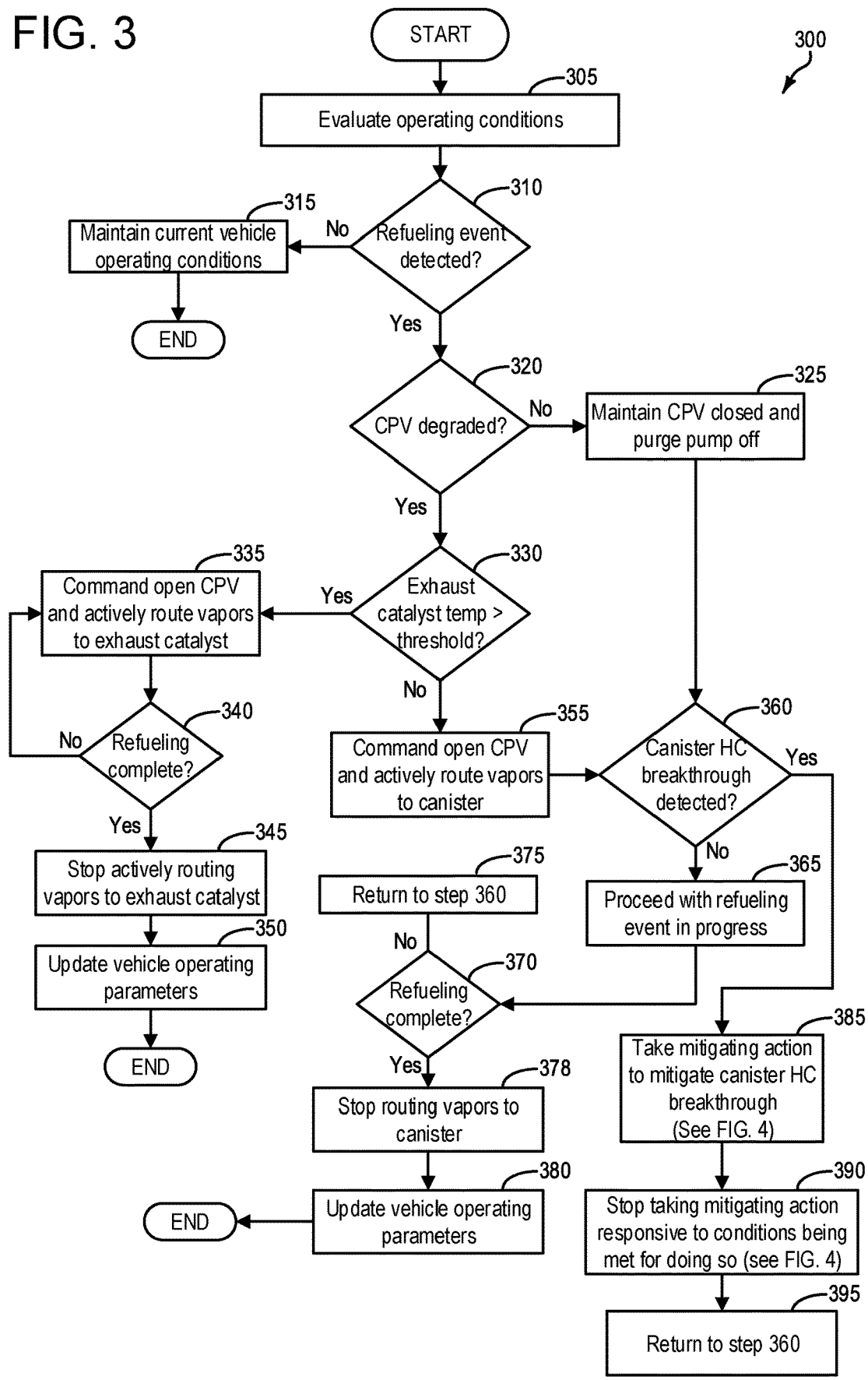
FIG. 3 shows a flowchart for a method for actively routing fuel vapors to a fuel vapor storage canister during a refueling event under conditions of a degraded canister purge valve.
Figure 4:
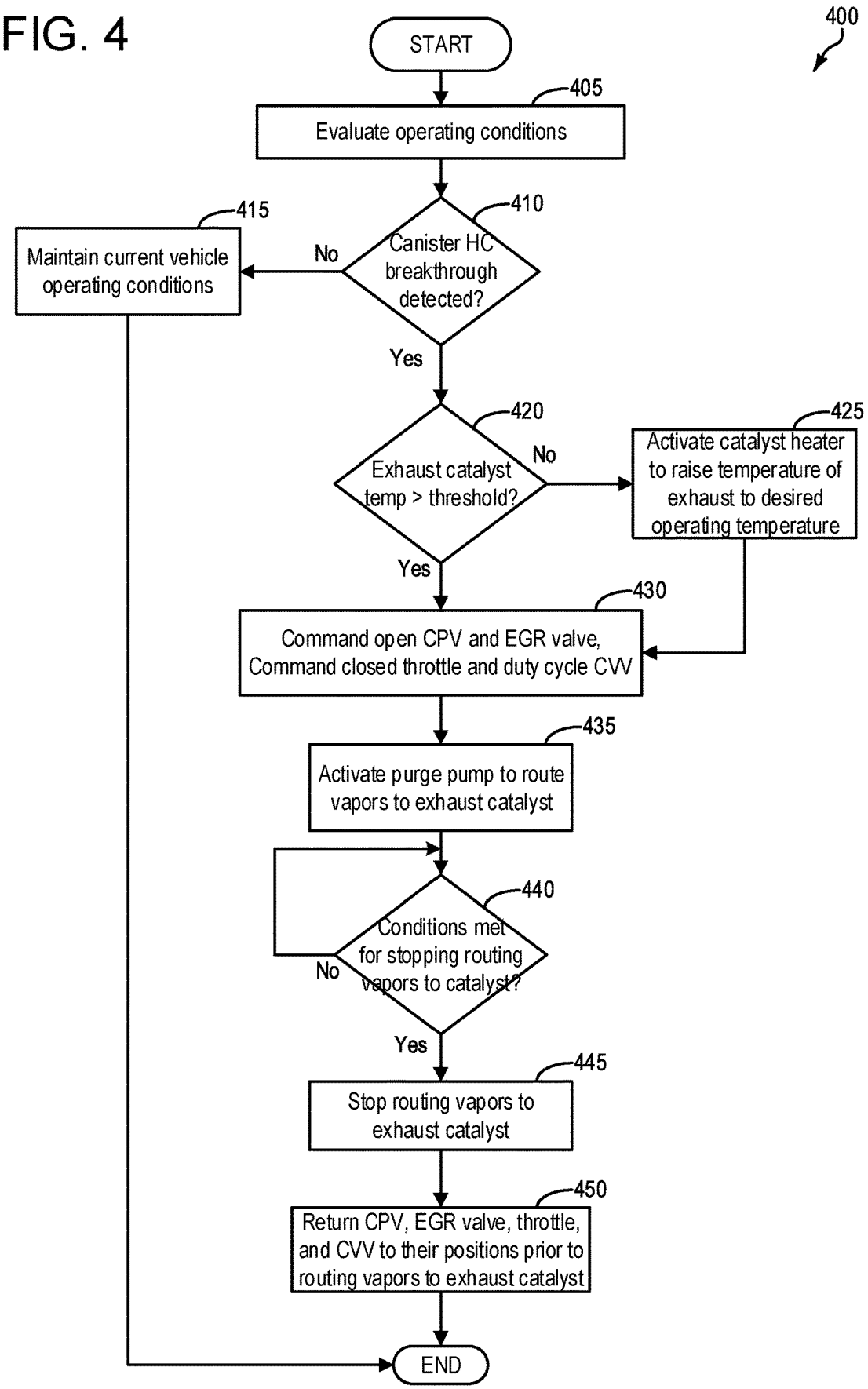
FIG. 4 shows a flowchart for a method for taking mitigating action in response to an indication of hydrocarbon breakthrough from a vehicle evaporative emissions system.
Figure 5:
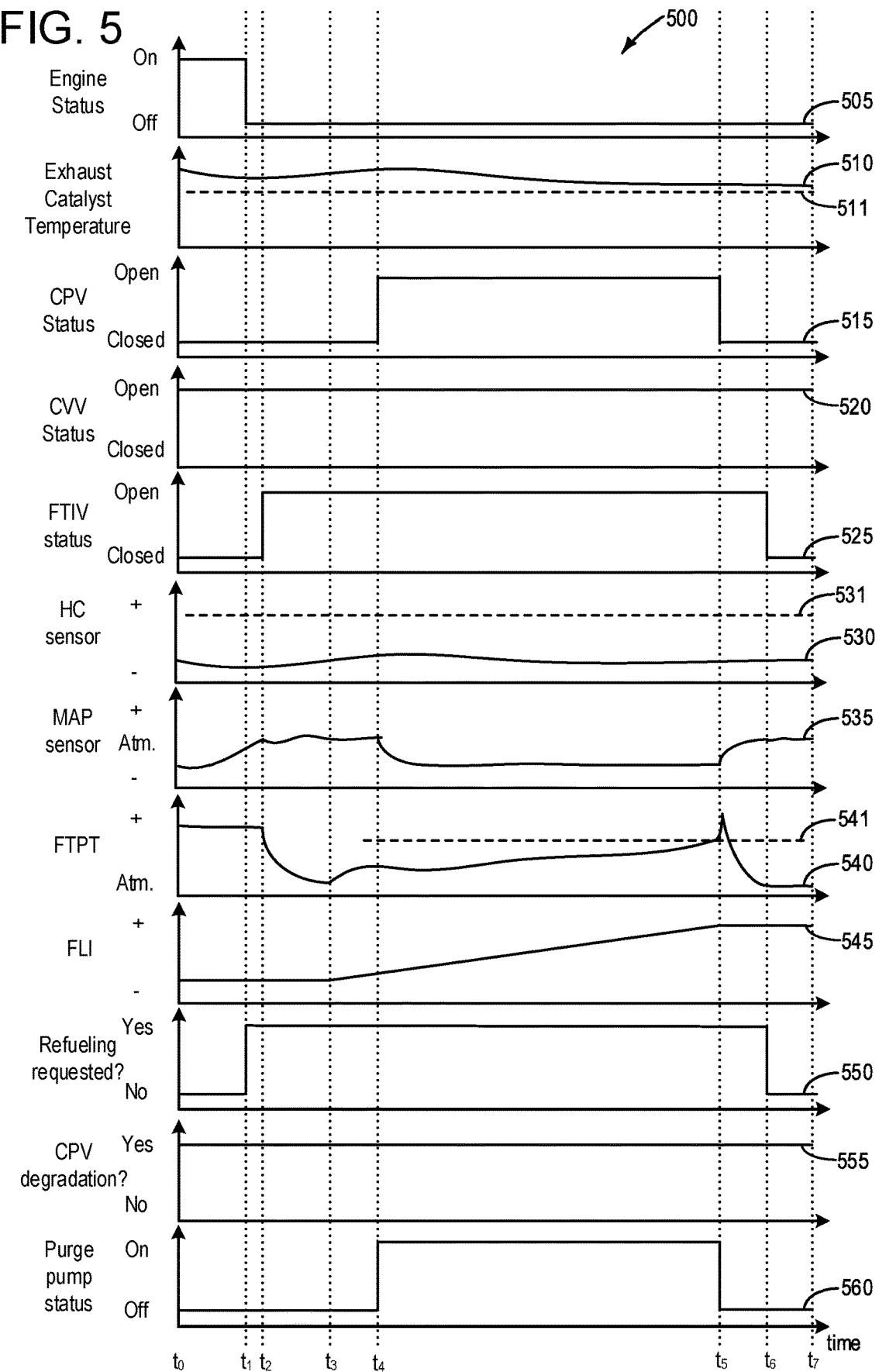
FIG. 5 depicts a timeline for actively routing fuel vapors to a fuel vapor storage canister during a refueling event according to the method of FIG. 3.
Figure 6:
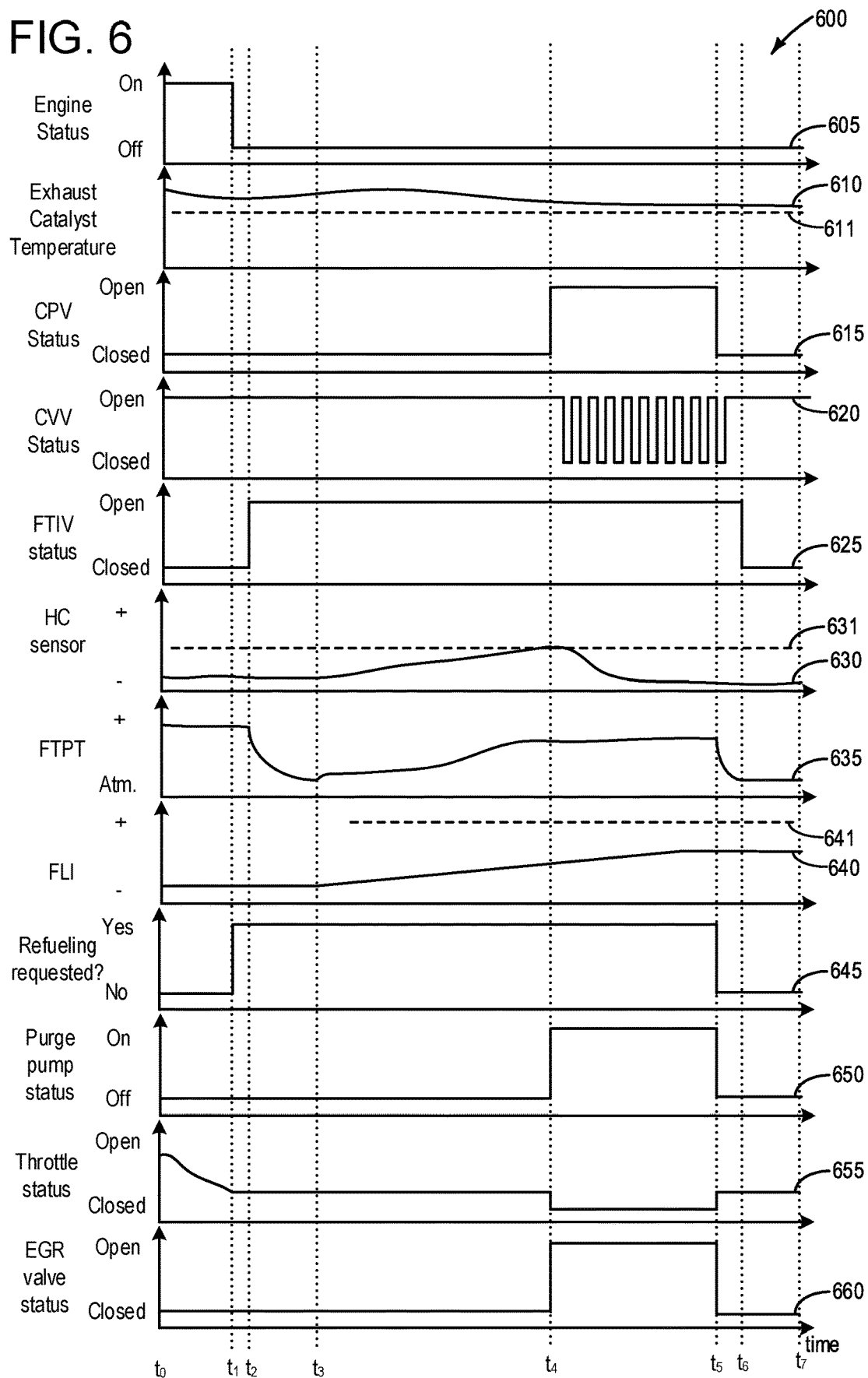
FIG. 6 depicts a timeline for actively routing fuel vapors to an exhaust catalyst in response to an indication of hydrocarbon breakthrough from an evaporative emissions system, according to the method of FIG. 4.

Such methods may be enabled via a hybrid vehicle, such as the hybrid vehicle system of FIG. 1. In one example, in response to an indication of a degraded CPV, a purge pump positioned between a canister purge valve and a fuel vapor storage canister may be activated during a refueling event, to force or actively route fuel vapors generated during the refueling event to the canister for storage, and to prevent the fuel vapors from migrating to engine intake and to atmosphere via the degraded CPV. Accordingly, FIG. 2 shows a vehicle system with an engine system coupled to an evaporative emissions system and a fuel system, depicting the purge pump, the CPV, and the canister. FIG. 3 depicts a method for actively routing fuel vapors to the canister during a refueling event under conditions of a degraded CPV. In some examples, during refueling events (or during S/S events), with or without a degraded CPV, fuel vapors may breakthrough from the canister and if mitigating action is not undertaken, undesired evaporative emissions may be released to atmosphere. Accordingly, FIG. 4 depicts a method for taking mitigating action to prevent or reduce release of undesired evaporative emissions to atmosphere in the event that breakthrough from the canister is detected. FIG. 5 depicts an example timeline for actively routing fuel vapors to the fuel vapor canister during a refueling event where CPV degradation is indicated. FIG. 6 depicts an example timeline for actively routing fuel vapors to an exhaust catalyst, responsive to an indication of breakthrough of fuel vapors from the canister during a refueling event.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operator input to shut down the engine, if selected idle-stop conditions, or in other words a set of predetermined conditions, are met. These may include, for example, engine torque demand being less than a threshold, vehicle speed below a threshold vehicle speed (e.g. 5 mph), the onboard energy storage device being sufficiently charged (e.g. charged greater than a threshold charge state), no request being received for air-conditioning, cabin-heating, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions may be reduced.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. It may be understood that vehicle system 206 may comprise the same vehicle system as the vehicle propulsion system depicted at FIG. 1. The vehicle system 206 includes an engine system 208 coupled to an emissions control system 251 and a fuel system 218 (e.g. 140). Emission control system 251 includes a fuel vapor storage canister/container or canister 222 which may be used to capture and store fuel vapors. In some examples, vehicle system 206 may be a hybrid electric vehicle system.

The engine system 208 may include an engine 210 (e.g. 110) having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. In some examples, a heater 280 may be configured to raise temperature of the exhaust catalyst, under conditions where it is desirable for temperature of the exhaust catalyst to be at or above a threshold temperature (e.g. light-off temperature), but where the engine is not combusting, for example. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from degraded injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 (e.g. 144) coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before enabling fuel to be added therein. As such, isolation valve 252 may be kept open during the refueling operation to allow refueling vapors to be stored in the canister. After refueling is completed, or in other words, concluded, the isolation valve may be closed.

As yet another example, the fuel system may be operated in a canister purging mode (e.g., after an emission control device, or exhaust catalyst, light-off temperature has been attained and with the engine running), wherein the controller 212 may open canister purge valve 261 while closing isolation valve 252. Herein, the vacuum generated by the intake manifold of the operating engine (or in some examples via the purge pump 299) may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

However, engine run time in HEVs and plug-in HEVs may be limited, thus reducing opportunities for conducting purging operations while the engine is on. Furthermore, in other examples engines may be configured to reduce intake manifold vacuum. More specifically, vacuum is a pumping loss and engine systems may be configured to reduce such vacuum. Accordingly, in some examples, a purge pump 299 may be positioned between the canister purge valve 261 and canister 222, to facilitate purging of the canister under conditions of low intake manifold vacuum, or under conditions where the engine is not in operation. When activated, for example via the controller sending a signal to a purge pump actuator 299a, the purge pump 299 may draw a vacuum on the canister in order to draw fuel vapors from the canister and route them to engine intake for combustion or to be processed via the exhaust catalyst (provided the exhaust catalyst is above its desired operating temperature).

The purge pump actuator 299a may comprise a pneumatic actuator, a hydraulic actuator, or an electric actuator. For example, where the actuator is electric, the electric actuator may comprise a motor, for example a direct current brushless motor. With the purge pump activated for purging purposes, it may be understood that the CVV may be commanded open to facilitate purging of the canister. Furthermore, when the purge pump is activated for purging purposes, it may be understood that the purge pump is rotating in a forward-mode of operation, where a vacuum (e.g. negative pressure with respect to atmospheric pressure) is drawn on the fuel vapor canister, and where a positive pressure with respect to atmospheric pressure is applied on the intake of the engine.

In some examples, it may be desirable to detect breakthrough evaporative emissions from a canister. Such conditions where breakthrough may occur include conditions where a canister is loaded or overloaded, high ambient temperature, etc. As discussed herein, such examples may include a refueling event where fuel is added to the fuel tank, or during a S/S event where the engine is off and not combusting air and fuel. To detect breakthrough emissions from a loaded canister, emission control system 251 may include a hydrocarbon sensor 250 positioned in the canister vent line 227 coupling the canister 222 and the atmosphere, and may provide an indication of hydrocarbon breakthrough from the canister to the atmosphere. In other examples, hydrocarbon sensor 250 may provide an indication of an ambient hydrocarbon amount in the atmosphere.

Controller 212 may comprise a portion of a control system 214 (e.g. 190). Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), and canister temperature sensor 232. Other sensors such as pressure, temperature, air/fuel ratio, and composition sensors may be coupled to various locations in the vehicle system 206. For example, a mass air pressure (MAP) sensor 217 may be included in the intake of the engine, and may be configured to monitor pressure level in the intake of the engine. As another example, the actuators may include fuel injector 266, throttle 262, fuel tank isolation valve 252, CPV 261 and refueling lock 245. The controller 212 may receive input data from the various sensors, process the input data, and trigger the actuators in response to the processed input data based on instruction or code programmed therein corresponding to one or more routines. Example control routines are described herein with regard to FIGS. 3-4.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

In some configurations, a canister vent valve (CVV) 297 may be coupled within vent line 227. CVV 297 may function to adjust a flow of air and vapors between canister 222 and the atmosphere. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

In some examples, exhaust gas recirculation (EGR) delivery passage 292 may be coupled to the exhaust passage 235 to provide high pressure EGR (HP-EGR) to the engine intake manifold. While not explicitly shown, such a passage may be coupled to the exhaust passage upstream of a turbine, and coupled to the intake manifold downstream of a compressor. An EGR valve 293 may be coupled to the EGR passage 292 at the junction of the EGR passage 292 and the intake passage 242. EGR valve 293 may be opened to admit a controlled amount of exhaust to the intake for desirable combustion and emissions control performance. EGR valve 293 may be configured as a continuously variable valve or as an on/off valve. In further embodiments, the engine system may additionally or alternatively include a low pressure EGR (LP-EGR) flow path wherein exhaust gas is drawn from downstream of a turbine (not shown) and recirculated to the engine intake manifold, upstream of a compressor (not shown).

One or more sensors may be coupled to EGR passage 292 for providing details regarding the composition and condition of the EGR. For example, a temperature sensor 294 may be provided for determining a temperature of the EGR, a pressure sensor 298 may be provided for determining a pressure of the EGR, a humidity sensor (not shown) may be provided for determining a humidity or water content of the EGR, and an air-fuel ratio sensor (not shown) may be provided for estimating an air-fuel ratio of the EGR. Alternatively, EGR conditions may be inferred by the one or more temperature, pressure, humidity, and air-fuel ratio sensors coupled to the intake, near a compressor inlet (not shown).

Thus, a system for a hybrid vehicle may comprise a controller with computer readable instructions stored in non-transitory memory. When executed, such instruction may cause the controller to actively route fuel vapors generated during a refueling event where fuel is added to a fuel tank of the vehicle to either a fuel vapor storage canister positioned in an evaporative emissions system of the vehicle, or to an exhaust catalyst positioned in an exhaust system of an engine for propelling the vehicle. Such active routing of fuel vapors may be conducted under conditions where a canister purge valve configured to selectively couple the fuel vapor storage canister to atmosphere is degraded, where actively routing fuel vapors includes activating a pump positioned downstream of the fuel tank and the fuel vapor storage canister.

In one example, the controller may store further instructions to actively route fuel vapors to the exhaust catalyst under conditions where a temperature of the exhaust catalyst is above a threshold temperature, and actively route fuel vapors to the fuel vapor storage canister under conditions where the exhaust catalyst is below the threshold temperature.

In another example, the pump may include one of the engine, or a purge pump positioned between the fuel vapor storage canister and the canister purge valve. In such an example, the controller may store further instructions to select whether to use the engine or the purge pump. Activating the pump may include rotating the engine unfueled in reverse or rotating the purge pump in a reverse-mode of operation to route fuel vapors to the fuel vapor storage canister, as opposed to rotating the engine unfueled in a forward direction or rotating the purge pump in a forward-mode of operation to route fuel vapors to the exhaust catalyst. In such an example, the controller may store further instructions to control a pressure directed toward the fuel vapor storage canister and the fuel tank while actively routing fuel vapors to the fuel vapor storage canister as a function of an engine intake pressure as monitored via a mass air pressure sensor positioned in an intake manifold of the engine, and a fuel tank pressure as monitored via a fuel tank pressure transducer. Such control of such pressure will be discussed in further detail below.

Turning now to FIG. 3, a high-level flowchart for an example method 300 for taking mitigating action to avoid fuel vapors being introduced to an intake of an engine and/or being released to atmosphere, is shown. More specifically, such mitigating action may be undertaken in response to a refueling event where a CPV is indicated to be degraded, and may include providing a motive force to push fuel vapors being generated in the fuel tank to a fuel vapor storage canister under conditions where an exhaust catalyst temperature is below its desired operating temperature (e.g. light-off temperature) or threshold temperature, or to the exhaust catalyst under conditions where the exhaust catalyst is above its desired operating temperature or threshold temperature.

Method 300 will be described with reference to the systems described herein and shown in FIGS. 1-2, though it will be appreciated that similar methods may be applied to other systems without departing from the scope of this disclosure. Instructions for carrying out method 300 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as motor/generator (e.g. 120), purge pump actuator (e.g. 299a) for controlling the purge pump (e.g. 299), throttle (e.g. 262), EGR valve (e.g. 293), CPV (e.g. 261), ELCM (e.g. 295), etc., according to the methods described herein.

Method 300 begins at 305, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 310, method 300 may include indicating whether a refueling event is detected. Indicating whether a refueling event is detected may include an indication that a vehicle operator has depressed a refueling button for unlocking a refueling lock, thus requesting refueling. A refueling event may additionally or alternatively be indicated via a fuel level indicator (FLI) (e.g. 234) providing information to the controller that fuel is being added to the fuel tank. A refueling event may additionally or alternatively be indicated via removal of a fuel cap (e.g. 205). If, at 310, a refueling event is not indicated to be in progress, method 300 may proceed to 315. At 315, method 300 may include maintaining current vehicle operating conditions. For example, if the vehicle is being propelled at least in part via the engine and/or via the motor (e.g. 120), then such operating conditions may be maintained. If the vehicle is not in operation, then fuel system, evaporative emissions system, and engine system components may be maintained in their current vehicle-off status. Method 300 may then end.

Returning to 310, in response to a refueling event being indicated, method 300 may proceed to 320. At 320, method 300 may include indicating whether the CPV (e.g. 261) is degraded. A degraded CPV may comprise a CPV that does not properly seal, or in other words, is stuck at least partially open or does not fully close. While not explicitly illustrated, such a determination may involve conducting a CPV diagnostic while the engine is in operation and where a threshold intake manifold vacuum is indicated. The CPV diagnostic may include commanding closed the CPV, and monitoring pressure in the fuel system/evaporative emissions system. For example, a pressure sensor (e.g. 291), or other pressure sensor positioned in the emissions control system may be monitored while the CPV is closed, and if intake manifold vacuum results in a pressure change as evidenced by the pressure sensor, then it may be indicated that the CPV is degraded, or in other words, not properly sealing or fully closing, as desired. It may be understood that if a FTIV (e.g. 252) is included in the vehicle system, then the FTIV may be commanded open for the CPV diagnostic if the FTPT is to be used for indicating the potential pressure change. In such a case, any pressure in the fuel system may first be allowed to stabilized, prior to conducting the CPV diagnostic.

If, at 320, the CPV is not indicated to be degraded, method 300 may proceed to 325, and may include commanding or maintaining the CPV closed for the refueling event. Furthermore, at 325, method 300 may include maintaining off the purge pump (e.g. 299), and maintaining the engine at rest (e.g. not rotating).

Returning to 320, in response to an indication that the CPV is degraded, method 300 may proceed to 330. At 330, method 300 may include indicating whether a temperature of the exhaust catalyst is greater than or equal to a threshold temperature. The threshold temperature may comprise a light-off temperature, or a desired operating temperature, for example. If, at 330, temperature of the exhaust catalyst (e.g. 270) is greater than or equal to the threshold temperature as measure by a temperature sensor (e.g. 279) configured to monitor exhaust catalyst temperature, then method 300 may proceed to 335. At 335, method 300 may include commanding open the CPV, and actively routing fuel vapors generated during the refueling event, to the exhaust catalyst. In such an example, actively routing vapors to the exhaust catalyst may comprise commanding on the purge pump in the forward-mode of operation via the controller sending a signal to the purge pump actuator (e.g. 299a), commanding the purge pump to operate in the forward-mode of operation. As discussed, the forward-mode of operation for the purge pump may be understood to comprise rotation of the pump such that positive pressure with respect to atmospheric pressure builds in the intake of the engine while the CPV is open. Furthermore, actively routing fuel vapors to the exhaust catalyst at 335 may further include the controller sending a signal to the throttle (e.g. 262), actuating it closed. Still further, actively routing fuel vapors to the exhaust catalyst may further include the controller sending a signal to the EGR valve (e.g. 293), actuating it fully open. If the throttle were not commanded closed, then fuel vapors may be pushed to atmosphere, rather than to engine intake and to the exhaust catalyst. Furthermore, by commanding fully open the EGR valve, rather than routing the fuel vapors through the restrictive engine compartment, which may include engine cylinders with intake and exhaust valves in various conformations, the fuel vapors may be routed around the engine compartment to the exhaust catalyst. Such routing around the engine compartment may be more efficient in comparison to attempting to route the fuel vapors through engine cylinders to the exhaust catalyst, which may result in less use of energy stored at the onboard energy storage device (e.g. 150). Such conservation of energy may be particularly advantageous or desirable in vehicles such as hybrid electric vehicles or plug-in hybrid electric vehicles.

At 335, it is herein recognized that there may be another option for actively routing vapors to the exhaust catalyst. Such an option may include operating the engine to rotate unfueled in the forward direction (e.g. the same direction the engine rotates when combusting air and fuel). A motor (e.g. 120) may be used to rotate the engine unfueled in the forward direction. Thus, by commanding open the CPV and activating the engine to rotate unfueled in the forward direction, the engine may draw a negative pressure on the evaporative emissions system and fuel system, which may draw fuel vapors to the engine and then the engine may push the fuel vapors to the exhaust catalyst. In such an example, the throttle may be maintained at least partially open, and the EGR valve may be commanded or maintained closed. However, the throttle may in other examples be commanded fully closed.

There may be advantages to using the purge pump as opposed to using the engine to actively route fuel vapors to the exhaust catalyst. For example, rotating or operating the purge pump may be less energetically demanding than rotating the engine. In other words, rotating the purge pump may involve less use of energy stored at the onboard energy storage device, as compared to rotating the engine unfueled. Thus, in one example, the controller may select to use the purge pump instead of the engine to actively route fuel vapors to the exhaust catalyst, as a function of a level of storage at the onboard energy storage device. For example, if energy storage level is greater than a threshold, then the engine may be used to actively route fuel vapors to the exhaust catalyst, whereas if energy storage level is below the threshold, then the purge pump may be used to actively route fuel vapors to the exhaust catalyst.

In another example, the engine may be selected to actively route fuel vapors to the exhaust catalyst, under conditions where the purge pump is degraded or otherwise not functioning as desired. For example, regardless of energy storage level at the onboard energy storage device, the purge pump may comprise the desired means for actively routing the fuel vapors to the exhaust catalyst, however the engine may be used under conditions where the purge pump is indicated to not be functioning as desired. In another example, if the EGR valve is indicated to be stuck closed, the energy benefit to using the purge pump over the engine may not be as great, thus in such an example where the EGR valve is stuck closed, then the engine may be selected instead of the purge pump, to actively route fuel vapors to the canister.

In either case, whether the engine is used to actively route fuel vapors to the exhaust catalyst, or if the purge pump is used to actively route fuel vapors to the exhaust catalyst, speed of the engine or purge pump may be controlled such that fuel vapors are effectively routed to the exhaust catalyst, while minimizing energy consumption. In other words, the engine or purge pump speed may be controlled to a lowest speed possible while effectively routing fuel vapors to the exhaust catalyst. In some examples, such a speed may comprise a predetermined engine speed or a predetermined purge pump speed. In some examples, a duty cycle of the purge pump may be controlled to minimize energy consumption while effectively routing fuel vapors to the exhaust catalyst. Such a duty cycle may comprise a predetermined duty cycle, in some examples.

Proceeding to 340, method 300 may include indicating whether refueling is complete, or concluded. Refueling being concluded may in one example be in response to fuel level as indicated by the FLI having plateaued (e.g. fuel level no longer rising) for a predetermined duration of time (e.g. 10 seconds, 30 seconds, etc.). Refueling being concluded may additionally or alternatively include an indication of an automatic shutoff of the refueling dispenser refueling the fuel tank. Such an indication may be in response to a rapid pressure increase as monitored by, for example, the FTPT (e.g. 291). Such a rapid pressure increase may be due to a fill limit venting valve (FLVV) (e.g. 285) closing in response to fuel level increasing to a point where the FLVV closes, thus resulting in the rapid pressure increase in the fuel tank. Refueling being concluded at 340 may additionally or alternatively include an indication that the refueling dispenser has been removed from the nozzle, that a fuel cap has been replaced, that a fuel lock has been re-locked, etc. If, at 340, refueling is not indicated to be concluded, then method 300 may return to 335 where fuel vapors may continue to be routed to the exhaust catalyst, as discussed. In the event that during the routing, temperature of the exhaust catalyst drops to or below the desired operating temperature, a heater (e.g. 280) may be activated to raise the temperature of the exhaust catalyst in order to maintain its temperature at or above the desired operating temperature.

Responsive to refueling being concluded at 340, method 300 may proceed to 345, and may include stopping actively routing fuel vapors to the exhaust catalyst. Stopping routing fuel vapors to the exhaust catalyst may include commanding off the purge pump via the controller sending a signal to the purge pump actuator (e.g. 299a), actuating the purge pump off, commanding closed the EGR valve and CPV, and returning the throttle to the position it was in prior to actively routing fuel vapors to the exhaust catalyst.

In some examples, stopping actively routing fuel vapors to the exhaust catalyst may be conducted a predetermined period of time after the refueling event is indicated to be concluded. In other words, fuel vapors may continue to be routed for the predetermined period of time, and then the routing may be stopped. The predetermined time may comprise an amount of time where it may be expected that all or nearly all fuel vapors in the purge line, engine intake, EGR passage, etc., have been moved to the exhaust catalyst. The predetermined time may comprise 1-2 seconds, 5 seconds, 10 seconds, etc. In this way, it may be ensured that fuel vapors are not present in the intake of the engine for the next engine start event.

It may be understood that in the event that the engine is utilized to actively route fuel vapors to the exhaust catalyst, then the engine may be deactivated at 345 (e.g. via the controller sending a signal to the motor (e.g. 120), actuating it off to stop rotation of the engine), and the CPV may be commanded closed.

Returning to 330, in response to temperature of the exhaust catalyst not being greater than or equal to the threshold temperature, or desired operating temperature, method 300 may proceed to 355. At 355, method 300 may include commanding open the CPV, and actively routing fuel vapors to the canister, rather than allowing fuel vapors generated during refueling to be directed to engine intake via the degraded CPV. Actively routing fuel vapors to the canister may comprise activating the purge pump (e.g. 299) in a reverse-mode of operation, via the controller sending a signal to the purge pump actuator (e.g. 299a), actuating on the purge pump in the reverse-mode of operation. The reverse-mode of operation for the purge pump may be understood to comprise rotation of the pump such that negative pressure with respect to atmosphere builds in the intake of the engine while the CPV is open. The purge pump operated in the reverse-mode thus imparts a positive pressure with respect to atmospheric pressure on the canister and fuel system. Such positive pressure directed toward the canister along the purge line, thus may prevent fuel vapors from being routed to engine intake via the degraded CPV. For actively routing fuel vapors to the canister, the throttle may be commanded or maintained to an at least partially open position, to reduce strain on the purge pump due to negative pressure building in the intake of the engine. For routing fuel vapors to the canister, the EGR valve may be maintained closed. However, in other examples, the EGR valve may be commanded open. Furthermore, an H-bridge circuit, may be utilized as is commonly known, for rotating the purge pump in the forward and/or reverse-modes. A similar H-bridge circuit may be used for rotating the engine in reverse.

Actively routing fuel vapors to the canister may include monitoring pressure via the FTPT (e.g. 291), to determine a pressure in the fuel system resulting from the addition of fuel to the fuel tank. In order to effectively route fuel vapors to the canister rather than the fuel vapors being routed to engine intake under conditions of a degraded CPV, the positive pressure directed toward the fuel vapor canister via the purge pump may be controlled to be slightly above (e.g. 1 InH2O) the fuel system pressure as judged by the FTPT. To control the positive pressure amount directed toward the canister, a MAP sensor (e.g. 217) may be utilized. The controller may estimate or infer an amount of positive pressure directed toward the canister via the purge pump, based on the amount of negative pressure indicated via the MAP sensor while the purge pump is activated with the CPV open. In other words, given the amount of vacuum the purge pump is drawing on the intake of the engine, an estimate of positive pressure directed to the canister may be indicated via the controller. In some examples, such an estimate may be further a function of throttle position (e.g. how open or closed the throttle is), and EGR valve position. In this way, pressure directed at the canister via the purge pump may be controlled to be slightly above the fuel system pressure, which may encourage fuel vapors to the fuel vapor storage canister, rather than the fuel vapors being directed to engine intake. Furthermore, pressure directed at the canister via the purge pump may be controlled such as not to induce undesired automatic shutoffs of the refueling dispenser. For example, the pressure directed at the canister may be controlled so as not inadvertently increase pressure in the fuel system to a level above which a refueling dispenser would be automatically shut off. Again, such control of pressure directed at the canister and fuel system may be based on fuel system pressure and pressure in the intake of the engine while the purge pump is activated in the reverse-mode of operation.

It may be understood that controlling pressure via the purge pump may include the controller sending a signal to the purge pump actuator (e.g. 299a), to control a speed of the pump, or in some examples a duty cycle of the pump. For example, speed or duty cycle of the pump may be increased to increase positive pressure directed toward the canister, whereas speed or duty cycle of the pump may be decreased to decrease positive pressure directed toward the canister, when operating the purge pump in the reverse-mode of operation.

Similar to that discussed above at step 335 of method 300, it is herein recognized that in some examples the engine may be used to actively route fuel vapors to the canister, rather than the purge pump. In such an example, the engine may be commanded via the controller to be rotated unfueled in reverse, with the CPV commanded open. Again, MAP as well as fuel system pressure may be monitored while rotating the engine unfueled in reverse, such that the positive pressure directed toward the fuel vapor canister and fuel system via the reverse engine rotation may be controlled to be slightly above (e.g. 1 InH2O) the fuel system pressure as indicated via the FTPT. In a case where the engine is utilized for actively routing fuel vapors to the canister, the throttle may be commanded closed such that air flow from the rotating engine is directed to the canister via the open CPV, and the EGR valve may be commanded or maintained closed.

As discussed above, controlling the positive pressure directed at the canister and fuel system may involve controlling a speed (e.g. RPM) of the engine, and a speed (e.g. RPM) of the purge pump, or duty cycle of the purge pump. For example, engine speed or purge pump duty cycle or speed may be increased in order to increase positive pressure directed at the canister and fuel system, whereas alternatively, engine speed or purge pump duty cycle or speed may be decreased to reduce an amount of positive pressure directed at the canister and fuel system.

As discussed, use of the engine may utilize more energy than the purge pump, for actively routing fuel vapors to the canister. Thus, the controller may in some examples select whether to use the purge pump or the engine, as a function of energy level stored at the energy storage device. For example, the engine may be selected responsive to energy level above the threshold while the purge pump may be selected responsive to energy level below the threshold. In another example, the engine may be selected over the purge pump, under conditions where the purge pump is indicated to be degraded or otherwise not functioning as desired. In another example, if the EGR valve is indicated to be stuck closed, then use of the purge pump may not provide an energy benefit as compared to using the engine to actively route fuel vapors to the canister. Thus, in such a case where the EGR valve is stuck closed, the engine may be selected to actively route fuel vapors to the canister, in some examples.

Regardless of whether fuel vapors are actively routed to the canister via the purge pump (or engine) operating in the reverse-mode (or being spun unfueled in reverse in the case of the engine) (step 355), or whether refueling proceeds without actively routing fuel vapors to the canister (step 325), method 300 may proceed to 360. At 360, method 300 may include indicating whether hydrocarbon (fuel vapor) breakthrough from the canister is detected. Breakthrough may be indicated via a hydrocarbon sensor (e.g. 250) positioned in the canister vent line (e.g. 227). Breakthrough may be indicated when the hydrocarbon sensor outputs a signal greater than or equal to a threshold HC sensor signal.

If, at 360, breakthrough is not indicated, method 300 may proceed to 365. At 365, method 300 may include proceeding with the refueling event in progress, whether that includes actively routing the fuel vapors to the canister, or proceeding with the refueling event without actively routing fuel vapors to the canister.

At 370, method 300 may include indicating whether refueling is complete, or concluded, as discussed above with regard to step 340 or method 300. At 370, if refueling is not indicated to be concluded, method 300 may proceed to 375, where method 300 may return to step 360 such that it may again be indicated whether breakthrough of fuel vapors from the canister is indicated.

Alternatively, in response to refueling being concluded, method 300 may proceed to 378. At 378, method 300 may include stopping routing vapors to the canister. For example, if routing the vapors to the canister included actively routing fuel vapors to the canister, then the purge pump (or engine) may be commanded off, and the CPV may be commanded closed. Furthermore, the FTIV (e.g. 252) may be commanded closed. While not explicitly illustrated above, for a refueling event, the FTIV may be commanded open to depressurize the fuel tank and to allow fuel to be added therein. Thus, after the refueling event, the FTIV (where included) may be commanded closed. Alternatively, if routing the vapors to the canister did not include activating the purge pump (or engine), but rather included the FTIV being open, as discussed, and the CPV being maintained/commanded closed, then the FTIV may be commanded closed in response to the refueling event being indicated to be concluded. In either example at 378, the FTIV may be commanded closed responsive to the fuel tank reaching atmospheric pressure, or within a threshold of atmospheric pressure.

Subsequent to stopping routing vapors to the canister (either actively via the purge pump/engine or passively), method 300 may proceed to 380. At 380, method 300 may include updating vehicle operating parameters. For example, a canister load may be updated, where such an update may be made based on a temperature change at the canister as monitored during the refueling event. Updating vehicle operating parameters may further include updating a purge schedule, responsive to the refueling event. Method 300 may then end.

Returning to 360, if breakthrough of fuel vapors from the canister is detected during the refueling event, then method 300 may proceed to step 385. At step 385, method 300 may include taking mitigating action to mitigate the breakthrough from the canister. Such a method is depicted at FIG. 4.

Accordingly, turning to FIG. 4, a high-level flowchart for an example method 400 for taking mitigating action in response to an indication of fuel vapor (e.g. hydrocarbon) breakthrough from a fuel vapor canister, is shown. Specifically, method 400 may include actively routing fuel vapors breaking through the canister to an exhaust catalyst via activation of a purge pump in the forward-mode, the purge pump positioned between the canister and the CPV (e.g.

261). In another example, the engine may be rotated in the forward direction to actively route fuel vapors to the exhaust catalyst. Method 400 may be a standalone method, or may be a sub-method of method 300 depicted above at FIG. 3. In the case where method 400 is a sub-method of method 300, it may be understood that step 410, in which canister breakthrough is indicated, may be the same step as step 360 depicted at FIG. 3.

Method 400 will be described with reference to the systems described herein and shown in FIGS. 1-2, though it will be appreciated that similar methods may be applied to other systems without departing from the scope of this disclosure. Instructions for carrying out method 400 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-2. The controller may employ actuators such as motor/generator (e.g. 120), throttle (e.g. 262), EGR valve (e.g. 293), purge pump (e.g. 299), CPV (e.g. 261), ELCM (e.g. 295), etc., according to the methods described herein.

Method 400 may begin at 405, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

At 410, method 400 may include indicating whether breakthrough of fuel vapors is indicated, discussed above at step 360 of method 300. If breakthrough is not indicated, method 400 may proceed to 415, and may include maintaining current vehicle operating conditions. For example, maintaining current vehicle operating conditions at 415 may include proceeding to step 365 of method 300, where the refueling event in progress may proceed without further change. In another example, method 400 of FIG. 4 may be conducted during a start/stop (S/S) event, where temperatures under the vehicle may rise, which may thus lead to breakthrough from the fuel vapor canister. In such a situation, if canister breakthrough is not detected, current vehicle operating conditions such as the engine being maintained off, the purge pump being maintained off, etc., may be maintained. Furthermore, during the S/S event, breakthrough from the canister may be continued to be monitored, until an engine start is requested.

Returning to 410, in response to fuel vapor breakthrough from the canister being indicated, method 400 may proceed to 420. At 420, method 400 may include indicating whether the exhaust catalyst temperature is greater than or equal to the threshold temperature, or desired operating temperature, as discussed above. If the exhaust catalyst temperature is not above the threshold, then method 400 may proceed to 425. At 425, method 400 may include activating the heater (e.g. 280) to raise temperature of the exhaust catalyst to or above the threshold temperature. A temperature sensor (e.g. 279) may be used to monitor temperature of the exhaust catalyst, such that when the threshold temperature is reached or exceeded, the heater may be deactivated.

Whether the exhaust catalyst was heated to raise its temperature to the threshold temperature, or whether the exhaust catalyst was already at or above the threshold temperature, method 400 may proceed to 430. At 430, method 400 may include commanding open the CPV, commanding fully closed the throttle, and commanding fully open the EGR valve. More specifically, the controller may send a signal to each of the CPV, throttle, and EGR valve, actuating the CPV to the open position, the throttle to the fully closed position, and the EGR valve to the fully open position. Furthermore, at 430, the CVV (e.g. 297) may be duty cycled (commanded open, then closed, in periodic fashion, via signals from the controller). In another example, the CVV may be commanded closed at 430. Duty cycling and/or commanding closed the CVV may serve to limit an amount of undesired evaporative emissions that would otherwise escape to atmosphere. In one example, the CVV may be commanded fully closed responsive to the indication of breakthrough, in order to induce an automatic shutoff of the refueling dispenser, in the case that the vehicle is being refueled.

Proceeding to 435, method 400 may include activating the purge pump in the forward-mode of operation, discussed above, to route fuel vapors to the exhaust catalyst. In a case where the CVV was commanded closed at 430, the CVV may be duty cycled at step 435. If the CVV were not duty cycled, then activation of the purge pump may result in an undesirable level of vacuum-build (e.g. negative pressure with respect to atmospheric pressure), in the fuel system and/or evaporative emissions system.

By activating the purge pump on in the forward-mode, fuel vapors that would otherwise have escaped to atmosphere may be drawn through the fuel vapor canister, and pushed through the purge line via the open CPV, to engine intake and then through the EGR passage to the exhaust catalyst.

It is herein recognized, similar to that discussed above, that in some examples the engine may be utilized to route fuel vapors to the exhaust catalyst. In such an example, rather than commanding open the EGR valve, the EGR valve may be maintained closed, and the engine may be activated to rotate unfueled in the forward direction. With the CPV commanded open, the engine may draw a negative pressure on the fuel system and evaporative emissions system, which may thus result in fuel vapors being drawn to the engine, and then pushed to the exhaust catalyst. Again, the use of the engine as compared to the purge pump may be in response to energy storage level at the energy storage device greater than the threshold, whereas use of the purge pump may be in response to energy storage level at the energy storage device below the threshold. In another example, the engine may be selected under conditions where the purge pump is indicated to not be functioning as desired, or in other words, is degraded. Alternatively, if the EGR valve is stuck closed, then the efficiency benefit to utilizing the purge pump to actively route fuel vapors to the exhaust catalyst may be reduced, such that using the engine may utilize a similar amount of energy. Thus, in such a case, the engine may be selected over the purge pump, in one example.

Proceeding to 440, method 400 may include indicating whether conditions are met for stopping or discontinuing the active routing of fuel vapors to the exhaust catalyst. In one example, conditions may be met in response to the purge pump being activated for a predetermined amount of time, where the predetermined amount of time may comprise a duration where it is expected or inferred that fuel vapor breakthrough to atmosphere is no longer likely. Additionally or alternatively, temperature of the fuel vapor canister may be monitored during the routing of vapors to the exhaust catalyst, and in response to an indication that a loading state of the canister has decreased to a predetermined loading state, then conditions may be indicated to be met for deactivating the purge pump. Additionally or alternatively, conditions may be met for deactivating the purge pump in response to an indication of an engine start request (in the case of a S/S event). Additionally or alternatively, conditions may be met for deactivating the purge pump in response to an indication that a refueling event is concluded, as discussed above.

Responsive to conditions being indicated to be met for stopping routing vapors to the exhaust catalyst, method 400 may proceed to 445. At 445, method 400 may include stopping the routing of vapors to the exhaust catalyst via commanding off (e.g. deactivating) the purge pump, or via stopping rotating the engine in the forward direction, unfueled.

Proceeding to 450, method 400 may include returning the CPV, EGR valve, throttle, and CVV to their respective positions prior to actively routing the fuel vapors to the exhaust catalyst.

In the case where method 400 comprises a sub-method of method 300, steps 440-450 may encompass step 390 of FIG. 4. In other words, responsive to taking mitigating action at step 385, which included using method 400 to actively route fuel vapors to the exhaust catalyst, upon conditions being met for stopping the routing, method 300 may stop actively routing fuel vapors to the catalyst at 390, and method 300 may then proceed to 395. At 395, method 300 may include returning to step 360. If, as expected, canister breakthrough is no longer detected, then method 300 may proceed to 365 where the refueling event in progress may proceed. For example, if the CPV was not indicated to be degraded, then the refueling event may proceed with the CPV maintained closed and the purge pump off. However, in an alternative situation where the CPV was indicated to be degraded, and where the CPV was commanded open and the purge pump commanded on to force fuel vapors to the canister rather than the vapors migrating via the degraded CPV to engine intake, such action may be resumed for the duration of the refueling event. In either case, method 300 may include indicating if refueling is concluded (step 370), and if not, the method may return to step 360 where hydrocarbon breakthrough may be continue to be assessed. Responsive to refueling being concluded, at 378, fuel vapors may stop being actively or passively routed to the canister. For example, if the purge pump is activated, then the purge pump may be deactivated, and the CPV may be commanded closed. If the purge pump was not activated, the purge pump may be maintained off, and the CPV may be maintained closed. In either case, the FTIV (where included) may be commanded closed, in some examples after pressure in the fuel system has reached atmospheric pressure, or is within a threshold pressure of atmospheric pressure.

Proceeding to 380, method 300 may include updating vehicle operating parameters, as discussed above. For example, a canister loading state may be updated as a result of the refueling event and in some examples further in response to the mitigating action undertaken to prevent release of undesired evaporative emissions from the canister to atmosphere. Still further, updating vehicle operating parameters may include updating a canister purge schedule, responsive to the refueling event. Method 300 may then end.

As discussed above in regards to method 300 and method 400, under conditions where the CPV is degraded and a refueling event is in progress, the purge pump may be activated in the reverse-mode to actively route fuel vapors to the canister. In another example, the engine may be utilized to actively route fuel vapors to the canister. If, during such routing, fuel vapors are indicated to break through the canister, if the purge pump was being utilized to actively route fuel vapors to the canister, then the purge pump may first be deactivated to stop rotating in the reverse-mode, and then may be reactivated to operate in the forward-mode to actively route fuel vapors to the exhaust catalyst. In another example, if the purge pump were used to actively route fuel vapors to the canister, upon breakthrough being indicated, the purge pump may be deactivated and the engine may be activated in the forward direction to route fuel vapors to the exhaust catalyst. In this way, a delay between deactivating the purge pump to stop actively routing fuel vapors to the canister, and then reactivating the purge pump to actively route fuel vapors to the exhaust catalyst, may be reduced. For example, simultaneous or nearly simultaneous (e.g. within less than a second or two or less) activation of the engine in the forward direction and deactivation of the purge pump, may effectively reduce a potential for escape of undesired evaporative emissions to atmosphere. Alternatively, in another example if the engine is utilized for routing fuel vapors to the canister, in response to an indication of breakthrough, the engine may be deactivated and the purge pump may simultaneous or nearly simultaneously be activated in the forward-mode, to actively route fuel vapors to the exhaust catalyst.

As discussed above, in one example, the CVV may be commanded closed in response to breakthrough from the canister being indicated/determined. If such breakthrough occurs during a refueling event, as discussed, it may be desirable to enable fuel to be re-added to the tank as long as mitigating action is being taken to reduce release of undesired evaporative emissions to atmosphere. Thus, in such an example, responsive to fuel vapors being actively routed to the exhaust catalyst via, for example forward-mode operation of the purge pump or rotation of the engine unfueled in the forward direction, the CVV may be duty cycled (or even commanded fully open), which may thus enable the addition of fuel to the tank without inducing an automatic shutoff. In such a case where an automatic shutoff is induced via the controller commanding closed the CVV, then upon indication that fuel vapors are actively being routed to the exhaust catalyst, an audible message may be conveyed via the controller, indicating that refueling may again commence. In another example, a text message may be sent to the vehicle operator's smartphone, indicating fuel may again be added to the tank.

Thus, the methods described above with regard to FIGS. 3-4 may enable a method comprising controlling an amount of pressure directed to a fuel tank that supplies fuel to an engine of a vehicle, and to a fuel vapor storage canister receiving fuel vapors from the fuel tank, via a pump positioned downstream of the fuel tank and the canister, to actively route fuel vapors to the canister during a refueling event where fuel is added to the fuel tank. In one example, the pump may include the engine, where directing pressure to the fuel tank and to the fuel vapor storage canister via the pump may include rotating the engine unfueled in reverse. Rotating the engine in reverse may include rotating the engine in an opposite direction as the direction the engine rotates when the engine is combusting air and fuel, for example. In another example, the pump may include a purge pump positioned in a purge line coupling the engine to the canister, and where directing pressure to the fuel tank and to the fuel vapor storage canister may include rotating the purge pump in a reverse-mode of operation. The reverse-mode of operation of the purge pump may include a direction of rotation opposite the direction of rotation the purge pump operates when operating to draw fresh air across the fuel vapor storage canister to induct fuel vapors stored in the canister to engine intake. In other words, the reverse-mode of operation of the purge pump may include rotating the purge pump in a direction opposite that which the purge pump rotates when operating to purge the fuel vapor storage canister.

In an example of the method, the refueling event may include an indication that a canister purge valve configured to selectively couple the engine to the canister and fuel tank is degraded.

In another example of the method, controlling the amount of pressure directed to the fuel tank and to the fuel vapor storage canister may include controlling the amount of pressure to avoid inducing an automatic shutoff of a refueling dispenser due to the pressure directed to the fuel tank and to the fuel vapor storage canister. In another example, controlling the amount of pressure directed to the fuel tank and to the fuel vapor storage canister may prevent fuel vapors generated during the refueling event from being routed to the engine. In yet another example, controlling the amount of pressure directed to the fuel tank and to the fuel vapor storage canister may be based on a fuel tank pressure, and a pressure in an intake manifold of the engine while the pump is activated to direct pressure to the fuel tank and to the fuel vapor storage canister.

In another example of the method, the method may further comprise reversing a direction that the pump is operating, in response to an indication of breakthrough of fuel vapors from the canister during the refueling event, to stop routing fuel vapors to the canister and to instead route fuel vapors to an exhaust catalyst positioned in an exhaust system of the engine. In such an example, routing fuel vapors to the exhaust catalyst may further comprise raising a temperature of the exhaust catalyst to a threshold temperature if the temperature of the exhaust catalyst is not already at or above the threshold temperature when the breakthrough of fuel vapors from the canister occurs.

In still another example of such a method, the pump may be selected as a function of an energy storage level of an onboard energy storage device.

Another example of a method may comprise actively routing fuel vapors to a fuel vapor storage canister configured to receive fuel vapors from a fuel tank in a vehicle, the fuel tank supplying fuel to an engine, during a refueling event where a canister purge valve configured to selectively couple the fuel vapor storage canister to the engine is degraded, and where actively routing the fuel vapors involves activating a pump positioned downstream of the fuel tank and the canister.

In such a method, the canister purge valve being degraded may include an indication that the canister purge valve is not capable of fully closing.

In such a method, actively routing fuel vapors to the fuel vapor storage canister may prevent fuel vapors from being introduced to the engine during the refueling event. In such a method, actively routing fuel vapors to the fuel vapors storage canister may further comprise controlling the pump to regulate a pressure amount directed to the fuel tank and the fuel vapor storage canister. For example, controlling the pump to regulate the pressure amount directed to the fuel tank and the fuel vapor storage canister may be a function of a fuel tank pressure and a pressure in an intake manifold of the engine.

In such a method, the pump may be selected via a controller, where the pump is one of a purge pump positioned between the fuel vapor storage canister and the canister purge valve, or the engine. In such an example, under conditions where the purge pump is selected, activating the pump may include activating the purge pump in a reverse-mode of operation. Alternatively, under conditions where the engine is selected, activating the pump may include rotating the engine unfueled in reverse.

In such a method, the method may further comprise monitoring a vent line coupling the fuel vapor storage canister to atmosphere for breakthrough of fuel vapors from the canister during the actively routing fuel vapors to a fuel vapor storage canister. In response to an indication of breakthrough, the method may include stopping actively routing the fuel vapors to the fuel vapor storage canister, and re-routing the fuel vapors to an exhaust catalyst positioned in an exhaust system of the engine.

Turning now to FIG. 5, an example timeline 500 depicting a refueling event where mitigating action is undertaken to prevent fuel vapors from being routed to engine intake via a degraded CPV, is shown. More specifically, method 500 includes activating a purge pump (e.g. 299) to generate a counter pressure to offset the pressure in the fuel system due to the refueling event, to route fuel vapors to a fuel vapor storage canister (e.g. 222), according to the method depicted at FIG. 3. Timeline 500 includes 505, indicating whether the engine is on, or off, over time. It may be understood that when the engine is on, the engine is combusting air and fuel, whereas when the engine is off, the engine is not rotating nor combusting air and fuel. Timeline 500 further includes plot 510, indicating a temperature of an exhaust catalyst (e.g. 270), over time. Line 511 represents a threshold temperature, where if the exhaust catalyst is at or above the threshold temperature, then the exhaust catalyst may be understood to be functioning as desired to process fuel vapors. Timeline 500 further includes plot 515, indicating a status of a CPV (e.g. 261), plot 520, indicating a status of a CVV (e.g. 297), and plot 525, indicating a status of an FTIV (e.g. 252), over time. The CPV, CVV, and FTIV may be either open (e.g. fully open) or closed (e.g. fully closed). Timeline 500 further includes plot 530, indicating a status of a hydrocarbon sensor, over time. More specifically, plot 530 indicates output of the hydrocarbon sensor as it relates to concentration of hydrocarbons as sensed via the hydrocarbon sensor. Increasing hydrocarbon concentration is denoted as "+", while decreasing hydrocarbon concentration is denoted as "−". Line 531 represents a threshold hydrocarbon concentration, corresponding to a particular output of the hydrocarbon sensor, where the threshold concentration corresponds to an indication of hydrocarbon breakthrough from the canister. In other words, below the threshold represented by line 531, breakthrough of fuel vapors from the canister is not indicated.

Timeline 500 further includes plot 535, indicating pressure in the engine intake, as monitored via a MAP sensor (e.g. 217), over time. Pressure may be either at atmospheric pressure (Atm.), or may be positive (+) with respect to atmospheric pressure, or negative (−) with respect to atmospheric pressure. Timeline 500 further includes plot 540, indicating fuel system pressure, as monitored via an FTPT (e.g. 291), over time. Pressure in the fuel system may be at atmospheric pressure (Atm.) or may be positive (+) with respect to atmospheric pressure. While not explicitly illustrated, it may be understood that fuel system pressure may in some examples be negative with respect to atmospheric pressure. Line 541 represents a threshold fuel system pressure which, if reached during a refueling event, may result in an automatic shutoff of a refueling dispenser that is adding fuel to the fuel tank.

Timeline 500 further includes plot 545, indicating fuel level in the fuel tank, monitored via a fuel level indicator (FLI) (e.g. 234), over time. Timeline 500 further includes plot 550, indicating whether refueling is requested (yes or no), over time. Timeline 500 further includes plot 555, indicating whether degradation of the CPV (e.g. 261) is indicated (yes or no), over time. Timeline 500 further includes plot 560, indicating a status of a purge pump (e.g. 299) (on or off), over time. In this example timeline, the purge pump being "on" refers to the purge pump being activated in the reverse-mode of operation, where positive pressure with respect to atmospheric pressure is directed to the fuel vapor canister, and where a negative pressure develops in the intake manifold, as discussed above.

At time t0, the engine is on (plot 505), exhaust catalyst temperature (plot 510) is above the temperature threshold (line 511), the CPV is closed (plot 515), the CVV is open (plot 520), and the FTIV is closed (plot 525). The HC sensor (plot 530) is not indicating any breakthrough of fuel vapors from the canister, and pressure in the intake manifold (plot 535), is a function of engine operating conditions. Pressure in the fuel system (plot 540) at time t0 is positive with respect to atmospheric pressure, due to the FTIV being closed. Fuel level (plot 545) in the fuel tank is low, and refueling is not yet requested (plot 550). Furthermore, the purge pump is off (plot 560), and CPV degradation (plot 555) is indicated.

At time t1, the engine is deactivated. Thus, it may be understood that the engine was propelling the vehicle until time t1, where the engine is stopped. In this example timeline, the engine stop thus correlates with a vehicle stop event, at a fuel filling station. Accordingly, at time t1, refueling is requested via the vehicle operator (plot 550).

With refueling requested, at time t2, the FTIV is commanded open to depressurize the fuel system, prior to allowing fuel to be added to the tank. Accordingly, between time t2 and t3, with the FTIV open and the CVV open, pressure in the fuel system decreases to atmospheric pressure (plot 540). With pressure in the fuel system at time t3 at atmospheric pressure, fuel begins being dispensed to the fuel tank. Accordingly, between time t3 and t4, fuel level increases in the fuel tank (plot 545). Because the CPV is indicated to be degraded (plot 555), at time t4 the CPV is commanded open, and the purge pump is commanded on, in reverse-mode, to counter the fuel system pressure in order to prevent fuel vapors from being directed to engine intake via the degraded CPV, and instead force the fuel vapors to the canister for storage.

Accordingly, between time t4 and t5, the purge pump is maintained on, and thus pressure in the intake manifold drops below atmospheric pressure, the result of the purge pump directing positive pressure in the direction of the canister along the purge line (e.g. 228). While not explicitly shown, pressure in the intake manifold may be used as a measurement to infer how much positive pressure is being directed toward the canister, in order to maintain the positive pressure from the purge pump slightly above (e.g. 1 InH2O above) fuel system pressure. In this way, fuel vapors generated during refueling may be forced to the canister.

The positive pressure from the purge pump may further be controlled such that pressure in the fuel system does not increase to a level where automatic shutoffs of the refueling dispenser may result. Such a threshold pressure is illustrated by line 541 of timeline 500. Thus, between time t4 and t5, pressure in the fuel system remains below the pressure where automatic shutoffs of the refueling dispenser may result.

At time t5, pressure in the fuel system reaches the threshold pressure, and spikes past the threshold pressure. It may be understood that such an abrupt increase in pressure is the result of a FLVV (e.g. 285) closing due to fuel level reaching a threshold fuel level. In other words, as the fuel level reaches the threshold fuel level, the mechanical FLVV closes, thus resulting in a rapid pressure build in the fuel system. The rapid pressure build thus serves to induce an automatic shutoff of the refueling dispenser.

Responsive to the indication that an automatic shutoff has been induced, the purge pump is deactivated, and the CPV is commanded closed. In some examples, the purge pump may be deactivated in response to fuel level reaching a predetermined level. In still other examples, the purge pump may be deactivated after a predetermined time duration after an automatic shutoff event or completion of refueling, as discussed above.

Between time t5 and t6, pressure in the fuel system decays back to atmospheric pressure, due to the automatic shutoff of the fuel dispenser, and further responsive to the FTIV and CVV being open. Responsive to pressure in the fuel system returning to atmospheric pressure, the FTIV is commanded closed at time t6. Furthermore, by time t6, pressure in the intake has also returned to atmospheric pressure. Between time t6 and t7, the engine is maintained off. For example, between time t6 and t7, the vehicle operator goes into the fuel filling station to pay for the fuel dispensed during the refueling event.

Thus, example timeline 500 depicts a situation where, rather than allowing fuel vapors to be introduced into the intake manifold during the refueling event where the CPV is degraded, fuel vapors were actively routed to the fuel vapor canister via the purge pump being activated in the reverse-mode. Because breakthrough of fuel vapors was not indicated for the duration of the refueling event, mitigating action did not have to be undertaken to prevent/reduce undesired evaporative emissions from being released to atmosphere. Furthermore, while example timeline 500 depicts the purge pump as actively routing fuel vapors to the canister, it may be understood that in other examples, the engine may be spun in reverse unfueled, as discussed, to actively route the fuel vapors to the canister. Thus, it may be understood that for example timeline 500, energy storage level of an onboard energy storage device was below the threshold, as discussed above.

Turning now to FIG. 6, an example timeline 600 for taking mitigating action during a refueling event to prevent or reduce undesired evaporative emissions from escaping to atmosphere via breakthrough of fuel vapors from a canister (e.g. 222), is shown. Timeline 600 includes plot 605, indicating engine status (on or off), over time. In this example timeline, when the engine is "on", the engine is combusting air and fuel, whereas when the engine is "off", the engine is not rotating, nor combusting air and fuel. Timeline 600 further includes plot 610, indicating temperature of an exhaust catalyst (e.g. 270), over time. Line 611 represents a threshold temperature, where if the exhaust catalyst is at or above the threshold temperature, then the exhaust catalyst is functioning as desired to process fuel vapors. Timeline 600 includes plot 615, indicating a status of a CPV (e.g. 261), plot 620, indicating a status of a CVV (e.g. 297), and plot

625, indicating a status of an FTIV (e.g. 252), over time. The CPV, CVV and FTIV may either be open (e.g. fully open), or closed (e.g. fully closed), over time.

Timeline 600 further includes plot 630, indicating an output from a hydrocarbon sensor (e.g. 250), over time, as discussed above. Line 631 represents a threshold output from the hydrocarbon sensor, indicating breakthrough of fuel vapor from the canister at a level where mitigating action is desirable to prevent/reduce fuel vapors from escaping to atmosphere. Timeline 600 further includes plot 635, indicating fuel system pressure, over time. Fuel system pressure may be either positive (+) with respect to atmospheric pressure, or near atmospheric pressure. While not explicitly illustrated, fuel system pressure may in some examples be negative with respect to atmospheric pressure.

Timeline 600 further includes plot 640, indicating fuel level in the fuel tank, as monitored via a fuel level indicator (FLI) (e.g. 234), over time. Timeline 600 further includes plot 645, indicating whether refueling is requested (yes or no), over time. Timeline 600 further includes plot 650, indicating whether a purge pump (e.g. 299) is on, or off, over time. In this example timeline, when the purge pump is "on", it may be understood that the purge pump is activated in the forward-mode, thus directing positive pressure with respect to atmospheric pressure, to the intake of the engine, and drawing a vacuum (negative pressure with respect to atmospheric pressure), on the canister/fuel system. Timeline 600 further includes plot 655, indicating a position of the throttle (e.g. 262), over time. The throttle may be fully open, fully closed, or somewhere between. Timeline 600 further includes plot 660, indicating a status of an EGR valve (e.g. 293), over time. The EGR valve may be either fully open, fully closed, or somewhere between.

At time t0, the engine is on (plot 605), and exhaust catalyst temperature (plot 610) is above the threshold temperature (line 611). The CPV is closed (plot 615), the CVV is open (plot 620), and the FTIV is closed (plot 625). There is no indication of fuel vapors breakthrough from the canister (plot 630). There is significant positive pressure with respect to atmospheric pressure in the fuel system (plot 635), fuel level in the fuel tank is low (plot 640), and refueling is not yet requested (plot 645). The purge pump is off (plot 650), and the throttle position is a function of driver demand (plot 655). Furthermore, the EGR valve is closed at time t0 (plot 660).

At time t1, the engine is deactivated, or turned off, so that it may be understood that the engine is no longer combusting air and fuel to propel the vehicle at time t1. In this example timeline 600, it may be understood that the engine is stopped due to the vehicle arriving at a fuel filling station, to refuel the fuel tank. Thus, at time t1, a refueling request is initiated (plot 645).

Accordingly, at time t2, in response to the refueling request, the FTIV is commanded open (plot 625), to depressurize the fuel tank prior to enabling fuel to be added therein. With the FTIV commanded open at time t2, pressure in the fuel system (plot 635) decreases to atmospheric pressure between time t2 and t3.

At time t3, fuel commences being added to the fuel tank (plot 640). While not explicitly illustrated, it may be understood that CPV degradation is not indicated, and thus, mitigating action such as that described above with regard to timeline 500 and method 300 need not be undertaken to prevent fuel vapors from being routed to engine intake, as the CPV is functioning as desired and is fully closed. However, as a refueling event may overload the canister with fuel vapors, which may lead to breakthrough of undesired evaporative emissions to atmosphere, output from the HC sensor is monitored during the refueling event (plot 630).

At time t4, as fuel is being added to the tank, the HC sensor output reaches a threshold output, represented by line 631, thus indicating breakthrough of fuel vapors from the canister. To prevent or reduce such breakthrough, the CPV is commanded fully open at time t4 (plot 615), the throttle is commanded fully closed (plot 655), the EGR valve is commanded fully open (plot 660), and the purge pump is commanded on (plot 650) in the forward-mode of operation. By configuring the above-mentioned valves/throttle as such, and by activating the purge pump in the forward-mode, fuel vapors may be drawn from the vent line and canister, and may be pushed via the open CPV to engine intake, and from there to the exhaust catalyst. Because the exhaust catalyst temperature (plot 610) is greater than the threshold temperature, represented by line 611, the heater configured to raise temperature of the exhaust catalyst is not activated.

Between time t4 and t5, the CVV is duty cycled (plot 620), to reduce any opportunity for release of undesired evaporative emissions to atmosphere, while enabling fresh air to be drawn across the canister, thus further desorbing fuel vapors from the canister and routing the vapors to the exhaust catalyst. Accordingly, between time t4 and t5, the output of the HC sensor (plot 630) indicates the absence of breakthrough from the canister.

At time t5, the purge pump is commanded off (plot 650), the throttle is returned to its position prior to routing the fuel vapors to the exhaust catalyst (plot 655), the EGR valve is commanded closed (plot 660), and the CPV is commanded fully closed. Between time t5 and t6, the CVV is commanded open, and thus pressure in the fuel system returns to atmospheric pressure. With the fuel system at atmospheric pressure, the FTIV is commanded closed at time t6. Between time t6 and t7, the engine is maintained off, for example, while the vehicle operator goes inside the filling station to pay for the fuel.

In this example timeline 600, the purge pump is indicated as being deactivated in response to the fuel level stabilizing, or in other words, in response to the refueling event being indicated to be complete, or concluded. In this example timeline, fuel level did not reach capacity, represented by line 641, thus an automatic shutoff of the refueling dispenser is not indicated. Thus, in response to fuel level stabilizing, indicating that further fuel is not being added to the tank, the routing of fuel vapors to the exhaust catalyst is stopped. However, in other examples, as discussed, the routing of fuel vapors to the exhaust catalyst may be stopped in response to a threshold canister load being reached, as indicated, for example, via temperature sensor(s) positioned within the canister and configured to report loading state of the canister. In another example, the purge pump may be activated for a predetermined period of time and then shut off, etc.

As discussed above with regard to FIG. 5, timeline 600 is illustrated as actively routing fuel vapors to the exhaust catalyst via operating the purge pump in the forward-mode. However, in other examples, the engine may be spun or rotated in the forward direction unfueled, to actively route fuel vapors to the exhaust catalyst. Thus, it may be understood that, for example timeline 600, energy storage level of an onboard energy storage device was below the threshold energy storage level, as discussed above.

In this way, release of undesired evaporative emissions to atmosphere may be reduced or avoided during refueling events, or other events, such as a S/S event. Furthermore, driveability issues and/or vehicle stall may be reduced or avoided. As such, environmental impact may be reduced, and customer satisfaction may be increased. Furthermore, engine lifetime may be increased, by avoiding undesirable engine operation situation such as vehicle stall or degraded drivability.

The technical effect is to recognize that release of undesired evaporative emissions may be mitigated, and driveability issues avoided, via diagnostics that include componentry already included in the vehicle system, for example a hybrid vehicle system. In one example, a technical effect includes recognizing that a purge pump included in vehicles that have limited engine run time, and/or for vehicles configured to limit intake manifold vacuum, may be used to actively route fuel vapors generated during a refueling event to a fuel vapor canister under conditions where a CPV is degraded (e.g. not fully closing). A further technical effect is to recognize that such action may alternatively be conducted via rotating the engine in reverse, to actively route fuel vapors to the canister under conditions where the CPV is degraded and the fuel tank is being refueled. Another technical effect is thus to recognize that selecting whether to use the engine or the purge pump to actively route fuel vapors to the canister may be a function of an energy storage level at the onboard energy storage device. A further technical effect is to recognize that the pressure directed toward the canister via either the purge pump or the engine may be controlled, so as to provide a slightly greater pressure than pressure in the fuel system, such that fuel vapors are prevented from being routed to engine intake, and are instead routed to the canister. Along the same lines, another technical effect is to recognize that pressure directed toward the canister may be controlled such that automatic shutoffs of the refueling dispenser do not undesirably occur.

Another technical effect is to recognize that, either during refueling, or other events such as S/S events, breakthrough emissions from a canister may occur. Thus, a technical effect is to recognize that such breakthrough may be mitigated via activating the purge pump or rotating the engine unfueled to draw fuel vapors from the canister and vent line coupled to the canister, and to route the fuel vapors to an exhaust catalyst for processing. Thus, a further technical effect is to recognize that under conditions where breakthrough is indicated, but where an exhaust catalyst is below its light-off temperature, that a heater coupled to the exhaust catalyst may be used to raise the temperature of the exhaust catalyst to or above its light-off temperature, just prior to routing the fuel vapors to the exhaust catalyst.

The systems described herein, with regard to FIGS. 1-2, along with the methods described herein, and with regard to FIGS. 3-4, may enable one or more systems and one or more methods. In one example, a method comprises controlling an amount of pressure directed to a fuel tank that supplies fuel to an engine of a vehicle, and to a fuel vapor storage canister receiving fuel vapors from the fuel tank, via a pump positioned downstream of the fuel tank and the canister, to actively route fuel vapors to the canister during a refueling event where fuel is added to the fuel tank. In a first example of the method, the method further includes wherein the pump includes the engine, and wherein directing pressure to the fuel tank and to the fuel vapor storage canister via the pump includes rotating the engine unfueled in reverse. A second example of the method optionally includes the first example, and further includes wherein the pump includes a purge pump positioned in a purge line coupling the engine to the canister, and wherein directing pressure to the fuel tank and to the fuel vapor storage canister includes rotating the purge pump in a reverse-mode of operation. A third example of the method optionally includes any one or more or each of the first and second examples, and further includes wherein the refueling event includes an indication that a canister purge valve configured to selectively couple the engine to the canister and fuel tank is degraded. A fourth example of the method optionally includes any one or more or each of the first through third examples, and further includes wherein controlling the amount of pressure directed to the fuel tank and to the fuel vapor storage canister includes controlling the amount of pressure to avoid inducing an automatic shutoff of a refueling dispenser due to the pressure directed to the fuel tank and to the fuel vapor storage canister. A fifth example of the method optionally includes any one or more or each of the first through fourth examples, and further includes wherein controlling the amount of pressure directed to the fuel tank and to the fuel vapor storage canister prevents fuel vapors generated during the refueling event from being routed to the engine. A sixth example of the method optionally includes any one or more or each of the first through fifth examples, and further includes wherein controlling the amount of pressure directed to the fuel tank and to the fuel vapor storage canister is based on a fuel tank pressure, and a pressure in an intake manifold of the engine while the pump is activated to direct pressure to the fuel tank and to the fuel vapor storage canister. A seventh example of the method optionally includes any one or more or each of the first through sixth examples, and further comprises reversing a direction that the pump is operating in response to an indication of breakthrough of fuel vapors from the canister during the refueling event, to stop routing fuel vapors to the canister and to instead route fuel vapors to an exhaust catalyst positioned in an exhaust system of the engine. An eighth example of the method optionally includes any one or more or each of the first through seventh examples, and further includes wherein routing fuel vapors to the exhaust catalyst further comprises raising a temperature of the exhaust catalyst to a threshold temperature if the temperature of the exhaust catalyst is not already at or above the threshold temperature when the breakthrough of fuel vapors from the canister occurs. A ninth example of the method optionally includes any one or more or each of the first through eighth examples, and further includes wherein the pump is selected as a function of an energy storage level of an onboard energy storage device.

Another example of a method comprises actively routing fuel vapors to a fuel vapor storage canister configured to receive fuel vapors from a fuel tank in a vehicle, the fuel tank supplying fuel to an engine, during a refueling event where a canister purge valve configured to selectively couple the fuel vapor storage canister to the engine is degraded, and where actively routing the fuel vapors involves activating a pump positioned downstream of the fuel tank and the canister. In a first example of the method, the method further includes wherein the canister purge valve being degraded includes an indication that the canister purge valve is not capable of fully closing. A second example of the method optionally includes the first example, and further includes wherein actively routing fuel vapors to the fuel vapor storage canister prevents fuel vapors from being introduced to the engine during the refueling event. A third example of the method optionally includes any one or more or each of the first through second examples, and further includes wherein actively routing fuel vapors to the fuel vapor storage canister further comprises controlling the pump to regulate a pressure amount directed to the fuel tank and the fuel vapor storage canister. A fourth example of the method optionally includes any one or more or each of the first through third examples, and further includes wherein controlling the pump to regulate the pressure amount directed to the fuel tank and the fuel vapor storage canister is a function of a fuel tank pressure and a pressure in an intake manifold of the engine. A fifth example of the method optionally includes any one or more or each of the first through fourth examples, and further includes wherein the pump is selected via a controller and where the pump is one of a purge pump positioned between the fuel vapor storage canister and the canister purge valve, or the engine; wherein under conditions where the purge pump is selected, activating the pump includes activating the purge pump in a reverse-mode of operation; and wherein under conditions where the engine is selected, activating the pump includes rotating the engine unfueled in reverse. A sixth example of the method optionally includes any one or more or each of the first through fifth examples, and further comprises monitoring a vent line coupling the fuel vapor storage canister to atmosphere for breakthrough of fuel vapors from the canister during the actively routing fuel vapors to a fuel vapor storage canister, and in response to an indication of breakthrough, stopping actively routing the fuel vapors to the fuel vapor storage canister, and re-routing the fuel vapors to an exhaust catalyst positioned in an exhaust system of the engine.

A system for a hybrid vehicle comprises a controller with computer readable instructions stored in non-transitory memory that, when executed, cause the controller to: actively route fuel vapors generated during a refueling event where fuel is added to a fuel tank of the vehicle to either a fuel vapor storage canister positioned in an evaporative emissions system of the vehicle or to an exhaust catalyst positioned in an exhaust system of an engine for propelling the vehicle under conditions where a canister purge valve configured to selectively couple the fuel vapor storage canister to atmosphere is degraded, where actively routing fuel vapors includes activating a pump positioned downstream of the fuel tank and the fuel vapor storage canister. In a first example of the system, the system further includes wherein the controller stores further instructions to actively route fuel vapors to the exhaust catalyst under conditions where a temperature of the exhaust catalyst is above a threshold temperature, and actively route fuel vapors to the fuel vapor storage canister under conditions where the exhaust catalyst is below the threshold temperature. A second example of the system optionally includes the first example, and further includes wherein the pump includes one of the engine, or a purge pump positioned between the fuel vapor storage canister and the canister purge valve; wherein the controller stores further instructions to select whether to use the engine or the purge pump and where activating the pump includes rotating the engine unfueled in reverse or rotating the purge pump in a reverse-mode of operation to route fuel vapors to the fuel vapor storage canister, as opposed to rotating the engine unfueled in a forward direction or rotating the purge pump in a forward-mode of operation to route fuel vapors to the exhaust catalyst; and wherein the controller stores further instructions to control a pressure directed toward the fuel vapor storage canister and the fuel tank while actively routing fuel vapors to the fuel vapor storage canister as a function of an engine intake pressure as monitored via a mass air pressure sensor positioned in an intake manifold of the engine, and a fuel tank pressure as monitored via a fuel tank pressure transducer.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
controlling an amount of pressure directed to a fuel tank that supplies fuel to an engine of a vehicle, and to a fuel vapor storage canister receiving fuel vapors from the fuel tank, via a pump positioned downstream of the fuel tank and the fuel vapor storage canister, to actively route fuel vapors to the fuel vapor storage canister during a refueling event where fuel is added to the fuel tank.

2. The method of claim 1, wherein the pump includes the engine, and wherein directing pressure to the fuel tank and to the fuel vapor storage canister via the pump includes rotating the engine unfueled in reverse.

3. The method of claim 1, wherein the pump includes a purge pump positioned in a purge line coupling the engine to the fuel vapor storage canister, and wherein directing pressure to the fuel tank and to the fuel vapor storage canister includes rotating the purge pump in a reverse-mode of operation.

4. The method of claim 1, wherein the refueling event includes an indication that a canister purge valve configured to selectively couple the engine to the fuel vapor storage canister and the fuel tank is degraded.

5. The method of claim 1, wherein controlling the amount of pressure directed to the fuel tank and to the fuel vapor storage canister includes controlling the amount of pressure to avoid inducing an automatic shutoff of a refueling dispenser due to the pressure directed to the fuel tank and to the fuel vapor storage canister.

6. The method of claim 1, wherein controlling the amount of pressure directed to the fuel tank and to the fuel vapor storage canister prevents fuel vapors generated during the refueling event from being routed to the engine.

7. The method of claim 1, wherein controlling the amount of pressure directed to the fuel tank and to the fuel vapor storage canister is based on a fuel tank pressure and a pressure in an intake manifold of the engine while the pump is activated to direct pressure to the fuel tank and to the fuel vapor storage canister.

8. The method of claim 1, further comprising reversing a direction that the pump is operating in response to an indication of breakthrough of fuel vapors from the fuel vapor storage canister during the refueling event, to stop routing fuel vapors to the fuel vapor storage canister and to instead route fuel vapors to an exhaust catalyst positioned in an exhaust system of the engine.

9. The method of claim 8, wherein routing fuel vapors to the exhaust catalyst further comprises raising a temperature of the exhaust catalyst to a threshold temperature if the temperature of the exhaust catalyst is not already at or above the threshold temperature when the breakthrough of fuel vapors from the fuel vapor storage canister occurs.

10. The method of claim 1, wherein the pump is selected as a function of an energy storage level of an onboard energy storage device.

11. A method, comprising:
actively routing fuel vapors to a fuel vapor storage canister configured to receive fuel vapors from a fuel tank in a vehicle, the fuel tank supplying fuel to an engine, during a refueling event where a canister purge valve configured to selectively couple the fuel vapor storage canister to the engine is degraded, and where actively routing the fuel vapors involves activating a pump positioned downstream of the fuel tank and the fuel vapor storage canister.

12. The method of claim 11, wherein the canister purge valve being degraded includes an indication that the canister purge valve is not capable of fully closing.

13. The method of claim 11, wherein actively routing fuel vapors to the fuel vapor storage canister prevents fuel vapors from being introduced to the engine during the refueling event.

14. The method of claim 11, wherein actively routing fuel vapors to the fuel vapor storage canister further comprises controlling the pump to regulate a pressure amount directed to the fuel tank and the fuel vapor storage canister.

15. The method of claim 14, wherein controlling the pump to regulate the pressure amount directed to the fuel tank and the fuel vapor storage canister is a function of a fuel tank pressure and a pressure in an intake manifold of the engine.

16. The method of claim 11, wherein the pump is selected via a controller and where the pump is one of a purge pump positioned between the fuel vapor storage canister and the canister purge valve, or the engine;
wherein under conditions where the purge pump is selected, activating the pump includes activating the purge pump in a reverse-mode of operation; and
wherein under conditions where the engine is selected, activating the pump includes rotating the engine unfueled in reverse.

17. The method of claim 11, further comprising monitoring a vent line coupling the fuel vapor storage canister to atmosphere for breakthrough of fuel vapors from the fuel vapor storage canister during the actively routing fuel vapors to the fuel vapor storage canister, and in response to an indication of breakthrough of fuel vapors, stopping actively routing the fuel vapors to the fuel vapor storage canister, and re-routing the fuel vapors to an exhaust catalyst positioned in an exhaust system of the engine.

* * * * *